United States Patent [19]
Lynch et al.

[11] Patent Number: 6,076,147
[45] Date of Patent: *Jun. 13, 2000

[54] NON-INCLUSIVE CACHE SYSTEM USING PIPELINED SNOOP BUS

[75] Inventors: William L. Lynch, La Honda; Al Yamauchi, Los Gatos, both of Calif.

[73] Assignee: Sun Microsystems, Inc., Palo Alto, Calif.

[ * ] Notice: This patent is subject to a terminal disclaimer.

[21] Appl. No.: 08/881,745

[22] Filed: Jun. 24, 1997

[51] Int. Cl.[7] ................................................... G06F 12/08
[52] U.S. Cl. ............................................ 711/146; 711/140
[58] Field of Search ................................ 711/146, 141, 711/140, 119, 120, 131, 144

[56] References Cited

U.S. PATENT DOCUMENTS

| | | | |
|---|---|---|---|
| 5,228,135 | 7/1993 | Ikumi ........................................ | 711/131 |
| 5,341,487 | 8/1994 | Derwin et al. ............................ | 711/146 |
| 5,559,987 | 9/1996 | Foley et al. ............................... | 711/144 |
| 5,623,628 | 4/1997 | Brayton et al. ........................... | 711/141 |
| 5,692,152 | 11/1997 | Cohen et al. ............................. | 711/140 |
| 5,701,422 | 12/1997 | Kirkland, Jr. et al. ................... | 710/129 |
| 5,715,428 | 2/1998 | Wang et al. .............................. | 711/141 |
| 5,787,478 | 7/1998 | Hicks et al. .............................. | 711/141 |
| 5,819,105 | 10/1998 | Moriarty et al. ......................... | 395/825 |
| 5,832,534 | 11/1998 | Singh et al. .............................. | 711/141 |
| 5,893,151 | 4/1999 | Merchant .................................. | 711/140 |
| 5,905,998 | 5/1999 | Ebrahim et al. .......................... | 711/144 |

*Primary Examiner*—Eddie P. Chan
*Assistant Examiner*—Gary J. Portka
*Attorney, Agent, or Firm*—Rosenthal & Osha LLP

[57] ABSTRACT

A non-inclusive cache system includes an external cache and a plurality of on-chip caches each having a set of tags associated therewith, with at least one of the on-chip caches including data which is absent from the external cache. A pipelined snoop bus is ported to each of the set of tags of the plurality of on-chip caches and transmits a snoop address to the plurality of on-chip caches. A system interface unit is responsive to a received snoop request to scan the external cache and to apply the snoop address of the snoop request to the pipelined snoop bus. A plurality of response signal lines respectively extend from the plurality of on-chip caches to the system interface unit, each of the signal lines for transmitting a snoop response from a corresponding one of the on-board caches to the system interface unit. The set of tags can be implemented by dual-porting the cache tags, or by providing a duplicate and dedicated set of snoop tags.

20 Claims, 4 Drawing Sheets

NON-INCLUSIVE CACHE SYSTEM USING PIPELINED SNOOP BUS

BACKGROUND OF THE INVENTION

1. Field of the Invention

The present invention generally relates to microprocessor architectures, and more particularly, the present invention relates to a pipelined snoop bus for maintaining coherence among caches in a multiprocessor configuration.

2. Description of the Related Art

In multiprocessor systems, processor cache memories often maintain multiple copies of a same data object. When one processor alters one copy of the data object, it is necessary to somehow update or invalidate all other copies of the object which may appear elsewhere in the multiprocessor system. Thus, to insure coherence among multiple copies, every valid write to one copy of an object must update or invalidate every other copy of the object.

Consider, for example, the conventional multiprocessor configuration illustrated in FIG. 1. To the left of the vertical dashed line sits the CPU chip 102, and located to the right of the dashed line are external (EXT.) components 104. Reference numeral 106 denotes an external cache (e-cache) which is visible to all processors and which interfaces with a main memory (not shown). Access to and from the main memory can only occur through the e-cache 106.

The CPU 102 contains multiple processors which share the main memory via the common memory bus (not shown) and the e-cache 106. When one processor is granted exclusive use of a data object, the object is placed in the external cache 106 and used on the CPU chip 102 until it is taken away or evicted from the e-cache 106. Illustrated within the CPU 102 are the on-board caches 108 and 110 associated with one processor. Cache 108 is a data cache (d-cache) for storing data as it is passed back and forth from the execution units of the processor, and cache 110 is an instruction cache (i-cache) holding instructions prior to execution by the processor's execution units.

Reference numeral 112 denotes an interface unit. When a processor desires exclusive use of an object from main memory, the corresponding interface unit issues a snoop request. Snooping protocols are generally designed so that all memory access requests are observed by each cache. In the event of a coherent write, each cache is responsive to the snoop request to scan its directory to identify any copies of the object which may require invalidation or updating. However, to avoid searching every cache directory upon the occurrence of every coherent write, the conventional systems adopt an "inclusive" approach to the cache coherencies.

The basic principal underlying cache coherency schemes is that when one processor is granted exclusive use of a data object, all other processors invalidate that data in their own memories. In the conventional inclusive cache coherency structure, the e-cache includes data existing in all the other caches on the chip. That is to say, any data that exists on the on-board caches of the chip must exist in the e-cache as well. If a data object gets evicted out of the e-cache or snooped out of the e-cache, it is removed from all the on-chip caches.

As such, referring to the flowchart of FIG. 2, when a snoop comes in from some other processor (step 202), the system interface unit 112 looks to the e-cache first to scan its contents (step 204), and if the data object is not there (NO at step 206), snooping is complete since the data object cannot exist on the on-board caches of the chip. Again, this is because every time something is evicted from the e-cache, it is invalidated on each of the on-board caches. If the data is found in the e-cache (YES at step 206), then the interface unit 112 sends out a signal to invalidate the data as it exists on the on-board caches.

Since snoop processing is complete when the data is not found in the e-cache, the conventional technique of looking first to the e-cache for the data has the effect of filtering the snoop requests applied to the on-board cache memories of the processors. This in turn reduces the average bandwidth of the on-board snoop processing.

However, the conventional scheme does suffer drawbacks. For example, each time a data object is evicted from the e-cache, it must be invalidated on each of the on-board memories to preserve the inclusiveness of the configuration. If the e-cache is a large direct-mapped cache, and something is evicted, it must be evicted (invalidated) in all the lower level caches as well, even if not necessary. This often results in inefficiencies, since the e-cache might have collisions which are not present in the on-board caches. This ultimately results in a reduction in the cache hit rate.

Further, it is always possible for a number of snoop requests to hit the e-cache in a row which require invalidates in the on-board memories, and thus, the chip must support this "peak" bandwidth. Thus, the filtering is of limited value since over any given stretch of time, it may be necessary to carry out on-board snoop processing at full bandwidth.

SUMMARY OF THE INVENTION

It is an object of the present invention is to overcome or at least minimize the drawbacks associated with the conventional snooping scheme described above.

It is a further object of the present invention to provide a snoop process for ensuring cache coherency without use of an inclusive e-cache arrangement in which all data found in the on-chip caches must be present in the e-cache as well.

According to one aspect of the invention, a non-inclusive cache system is provided which includes an external cache; a plurality of on-chip caches each having a set of tags associated therewith, at least one of the on-chip caches including data which is absent from the external cache; a pipelined snoop bus, ported to each of the set of tags of the plurality of on-chip caches, which transmits a snoop address to the plurality of on-chip caches; and a system interface unit which is responsive to a received snoop request to scan the external cache and to apply the snoop address of the snoop request to the pipelined snoop bus.

According to another aspect of the invention, a plurality of response signal lines respectively extend from the plurality of on-chip caches to the system interface unit, each of the signal lines for transmitting a snoop response from a corresponding one of the on-chip caches to the system interface unit.

According to yet another aspect of the invention, a same multiple number of clock cycles are expended between a transmission of the snoop address on the pipelined snoop bus to receipt of the snoop response from each of the on-chip caches.

According to still another aspect of the invention, the snoop request is either one of two types, a first type being a request to invalidate a data object contained in any of the on-chip caches, and a second type being a request to check for the presence of the data object in any of the on-chip caches.

According to another aspect of the invention, the set of tags includes a set cache tags and a dedicated set of snoop tags duplicating the set of cache tags, and the pipelined snoop bus is ported to each of the dedicated set of snoop tags.

According to still another aspect of the invention, the sets of tags includes a set of dual-port cache tags.

BRIEF DESCRIPTION OF THE DRAWINGS

The above and other objects and advantages of the present invention will become readily apparent to those skilled in the art from the description that follows, with reference to the accompanying drawings, in which.

DETAILED DESCRIPTION OF THE PREFERRED EMBODIMENTS

Figure 1:
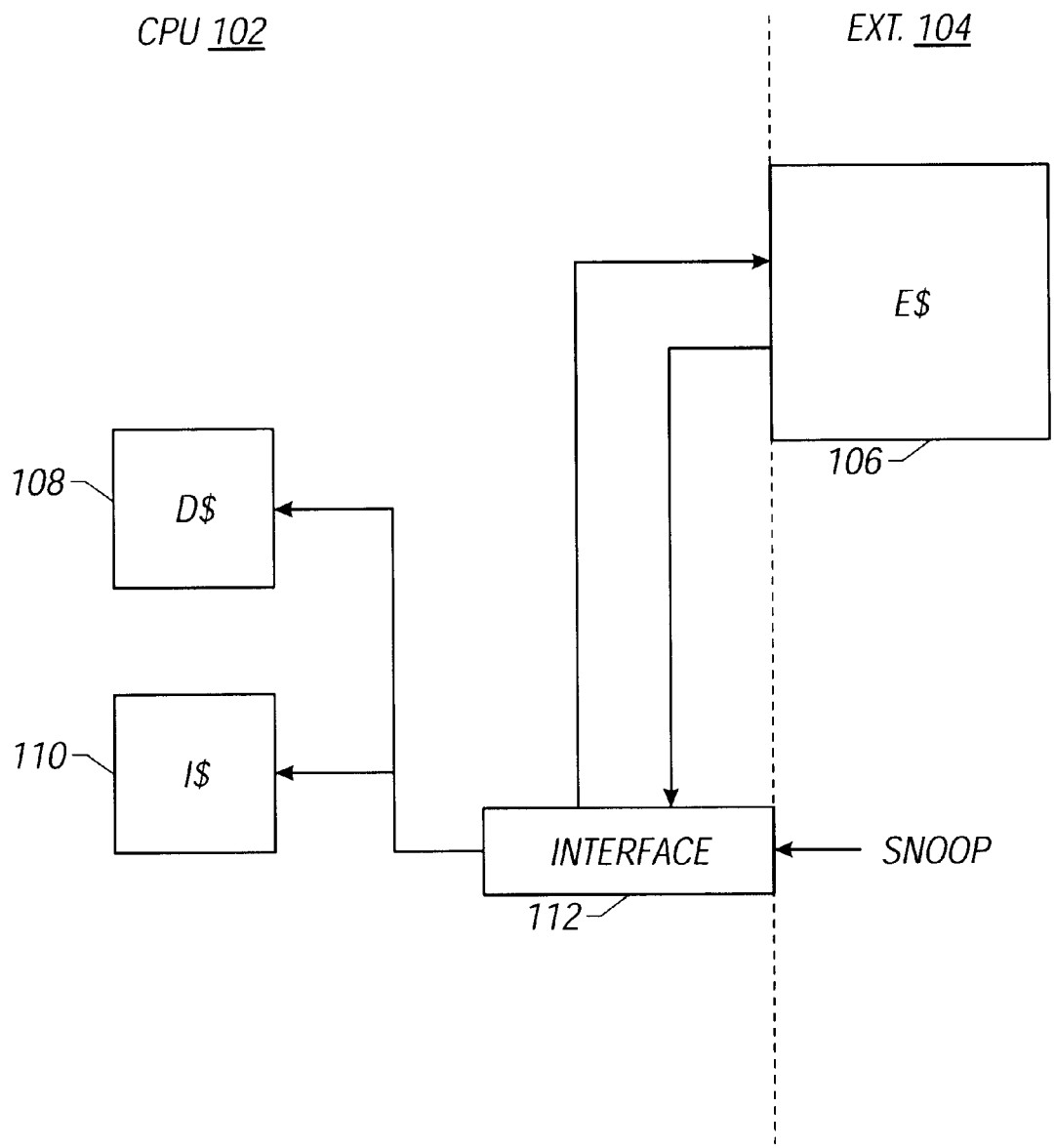
FIG. 1 is a block diagram for explaining the conventional inclusive-type cache coherency configuration.
Figure 2:
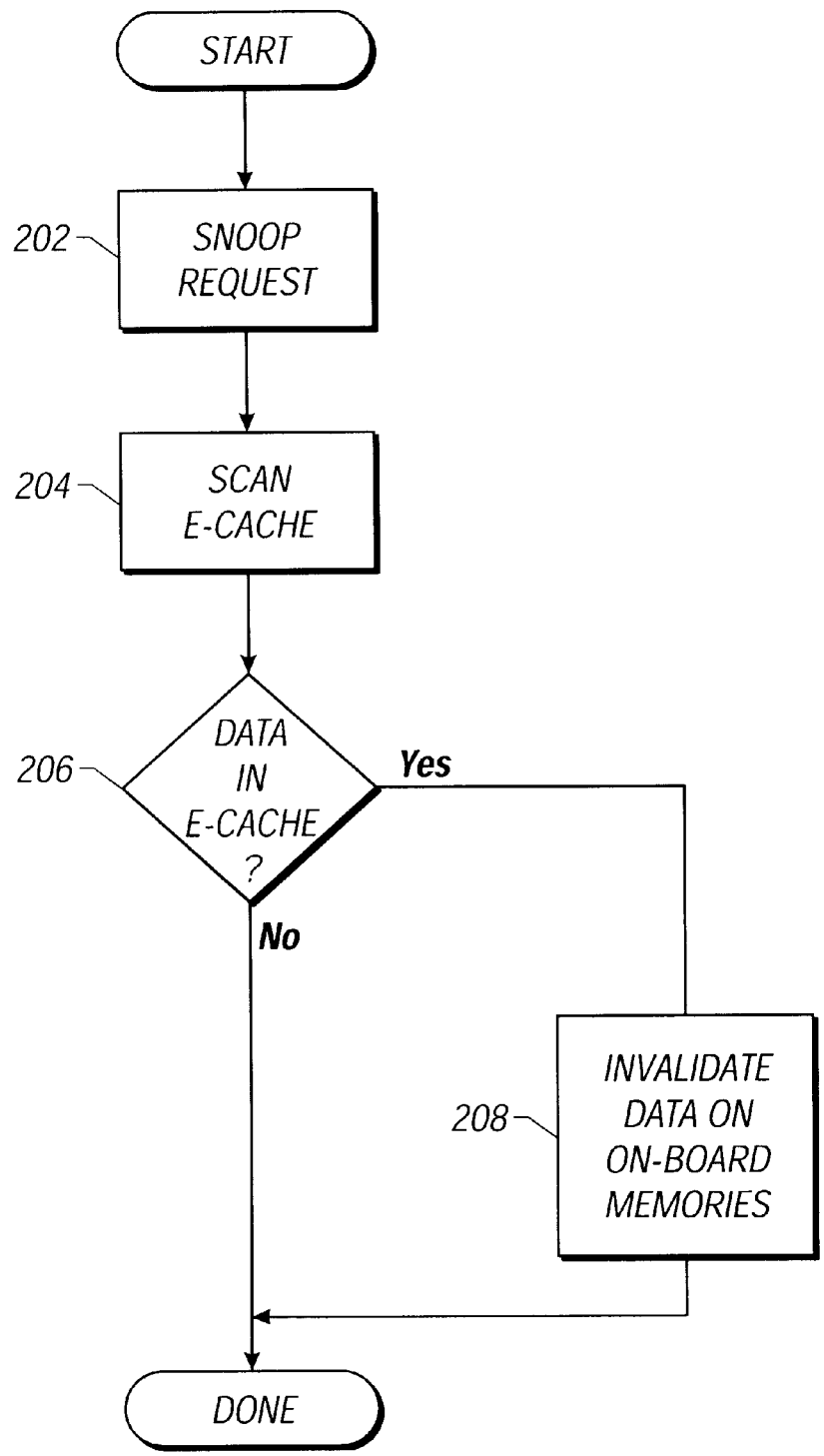
FIG. 2 is a simplified flowchart for explaining the snooping protocol of the configuration shown in FIG. 1.
Figure 3:
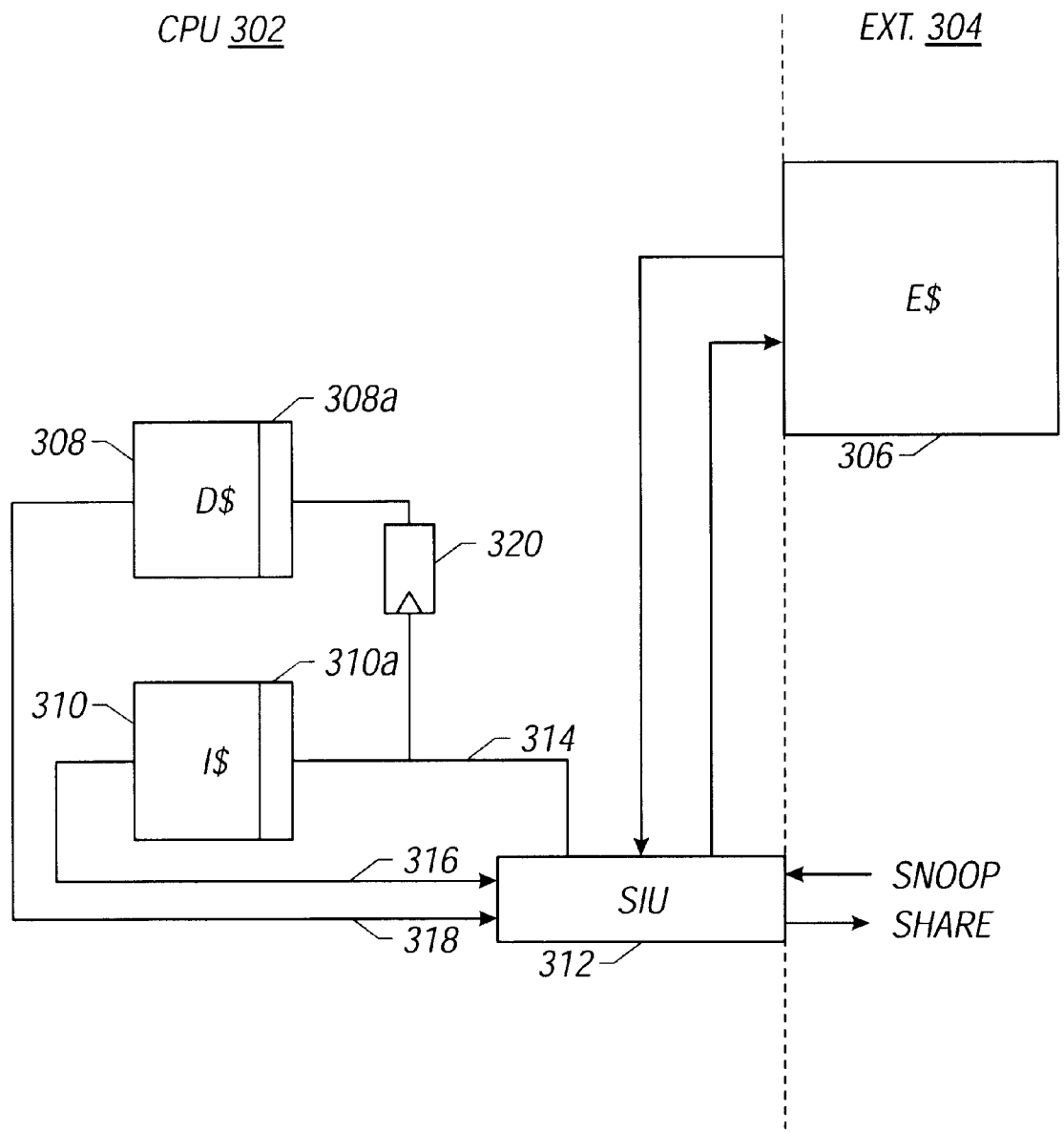
FIG. 3 is a block diagram for explaining the non-inclusive cache coherency configuration of the present invention; and, FIG. 4 is a simplified flowchart for explaining the snooping protocol of the configuration shown in FIG. 3.

The present invention, an exemplary embodiment of which is shown in FIG. 3, presents a non-inclusive implementation of a cache coherency scheme. That is, there is no requirement that all data contained in the on-chip caches also be present in the off-chip e-cache as well.

Referring to FIG. 3, to the left of the vertical dashed line sits the CPU chip 302, and located to the right of the dashed line are external (EXT.) components 304. Reference numeral 306 denotes an external cache (e-cache) which is visible to all processors and which interfaces with a main memory (not shown). Access to and from the main memory can only occur through the e-cache 306.

The CPU chip 302 contains multiple processors which share the main memory via the common memory bus (not shown) and the e-cache 306. When one processor is granted exclusive use of a data object, the object is placed in the external cache 306 and used on the CPU chip 302 until it is taken away or evicted from the e-cache 306. Illustrated within the CPU chip 302 are the on-board caches 308 and 310 associated with one processor. Cache 308 is a data cache (d-cache) for storing data as it is passed back and forth from the execution units of the processor, and cache 310 is an instruction cache (i-cache) holding instructions prior to execution by the processor's execution units. Each processor may have other types of caches as well.

Each cache includes special snoop tags 308a and 310a which effectively duplicate the corresponding cache tags. Alternatively, the cache tags themselves may be dual-ported to provide a dedicated set of tags ports for snooping. In either case, the arrangement should support a full snoop bandwidth.

Reference numeral 312 denotes a system interface unit (SIU). When a processor desires exclusive use of an object from main memory, the corresponding interface unit 312 issues a snoop request. Reference number 314 is a dedicated pipelined snoop bus which transmits the snoops in a pipeline, and reference numerals 316 and 318 are dedicated snoop response lines.

Figure 4:
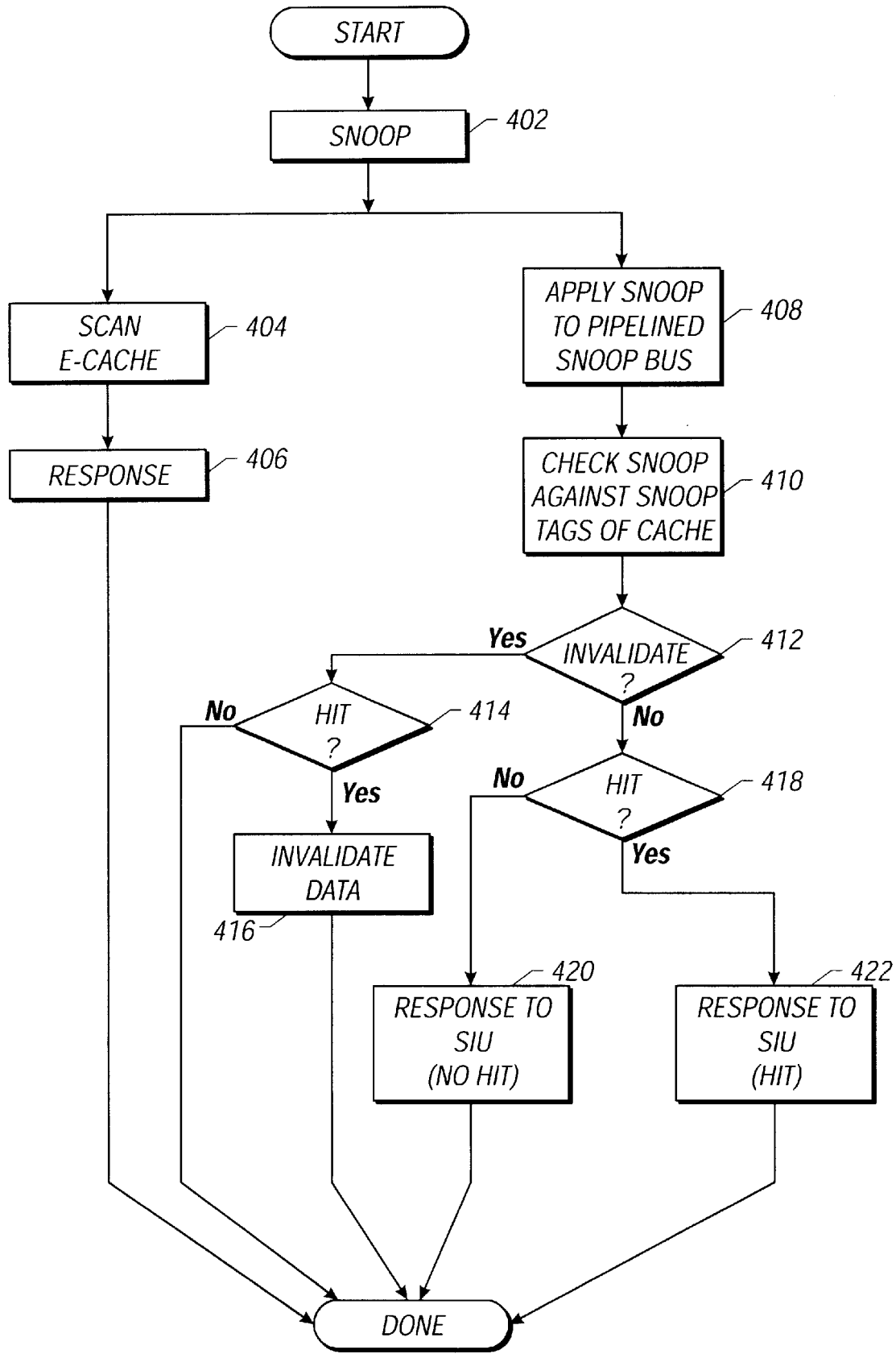

The operation of the invention will now be described with reference to the flowchart of FIG. 4, as well as the block diagram of FIG. 3.

A snoop arrives to the system interface unit 312 (step 402), and, in the normal manner, the tags on the e-cache 306 are checked right away (step 404). A response is returned from the e-cache 306 indicating whether one of the e-cache tags matches the snoop address. Even in the event that the object is not found in the e-cache 306, it is still necessary to examine the on-chip caches. Again, the cache coherency system of the invention is non-inclusive, meaning that data may exist in an on-chip cache and not be present in the e-cache 306.

Thus, in addition to checking the e-cache in steps 404 and 406, the SIU 312 must check the on-chip caches as well. This is illustrated by steps 408–422 which run in parallel to steps 404 and 406.

Initially, the SIU 312 applies the snoop to the pipelined snoop bus 314 (step 408), and the snoop address is checked against the special dedicated snoop tags of each cache (step 410). It is noted that there is no filtering of snoops in the present invention, and thus, the snoops tags are designed at full bandwidth.

In one embodiment of the invention, there are two types of snoop requests. The first simply invalidates the object, if it is present, and requires no response back. The second (called a "shared response" herein) checks for the presence of an object and thus requires a response back. In the case of the former (YES at step 412), the object in the cache is invalidated (step 416) if it exists, i.e., if there is a match between the snoop address and a cache tag (YES at step 414). In the case of the later (NO at step 412), responses are sent back to the SIU 312 on lines 316 and 318 indicating that the data object is located in the on-chip caches (step 422) or is not located in the on-chip caches (step 420). The lines 316 and 318 are preferably one-bit wide, indicating the presence or absence of the snooped data object in each cache.

According to the invention, the snoop bus 314 is pipelined and goes to its own dedicated port of tags. Moreover, the snoops do not arrive at the tags in one cycle. Rather, in the embodiment of the invention, it takes two cycles to get to the chip tag, and then up to three cycles to go through them, and then another two cycles to go back to the SIU 312. Reference numeral 320 is a delay which is representative of the lengthening of the loops. Since it is generally not possible to get all the way across the chip and back in one cycle, the loops are designed to have the same operational length of a specific number of cycles. In this manner, the SIU 312 knows the timing (number of cycles) of the response back from the caches. Moreover, the pipelined bus is a part of the implementation that allows the system to work at the clock frequency.

Thus, according to the invention, the snoop bus and duplicated snoop tag RAMs are fully pipelined. All snoops (invalidate and share) are handled by all the on-chip caches since such caches may contain data not found in the e-cache. Also, shared responses are of a fixed latency to the snoop originator or system interface unit.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a processor system having a plurality of processors, a non-inclusive cache system, comprising:

an external cache;

a plurality of on-chip caches each having a set of tags associated therewith, each of said plurality of processors having associated therewith at least one of said plurality of on-chip caches, and at least one of the on-chip caches including data which is absent from said external cache;

a pipelined snoop bus, ported to the set of tags of each of said plurality of on-chip caches, which transmits snoop addresses to said plurality of on-chip caches; and a system interface unit which in response to a received snoop request scans said external cache for an address matching a snoop address of the received snoop request, and applies the snoop address of the received snoop request to said pipelined snoop bus for transmission to said plurality of on-chip caches.

2. A non-inclusive cache system as claimed in claim 1, further comprising a plurality of response signal lines respectively connected from said plurality of on-chip caches associated with said plurality of processors to said system interface unit, each of said signal lines for transmitting a snoop response from a corresponding one of said plurality of on-chip caches to said system interface unit.

3. A non-inclusive cache system as claimed in claim 2, wherein multiple clock cycles are expended between a transmission of the snoop address on said pipelined snoop bus to receipt of the snoop response from each of said on-chip caches.

4. A non-inclusive cache system as claimed in claim 2, wherein a same multiple number of clock cycles are expended between a transmission of the snoop address on said pipelined snoop bus to receipt of the snoop response from each of said on-chip caches.

5. A non-inclusive cache system as claimed in claim 1, wherein the snoop request is either one of two types, a first type being a request to invalidate a data object contained in any of said on-chip caches, and a second type being a request to check for the presence of the data object in any of said on-chip caches.

6. A non-inclusive cache system as claimed in claim 2, wherein the snoop request is either one of two types, a first type being a request to invalidate a data object contained in any of said on-chip caches, and a second type being a request to check for the presence of the data object in any of said on-chip caches.

7. A non-inclusive cache system as claimed in claim 3, wherein the snoop request is either one of two types, a first type being a request to invalidate a data object contained in any of said on-chip caches, and a second type being a request to check for the presence of the data object in any of said on-chip caches.

8. A non-inclusive cache system as claimed in claim 4, wherein the snoop request is either one of two types, a first type being a request to invalidate a data object contained in any of said on-chip caches, and a second type being a request to check for the presence of the data object in any of said on-chip caches.

9. A non-inclusive cache system as claimed in claim 1, wherein said set of tags includes a set of cache tags and a dedicated set of snoop tags duplicating said set of cache tags, and wherein the pipelined snoop bus is ported to each of said dedicated set of snoop tags.

10. A non-inclusive cache system as claimed in claim 2, wherein said set of tags includes a set of cache tags and a dedicated set of snoop tags duplicating said set of cache tags, and wherein the pipelined snoop bus is ported to each of said dedicated set of snoop tags.

11. A non-inclusive cache system as claimed in claim 3, wherein said set of tags includes a set of cache tags and a dedicated set of snoop tags duplicating said set of cache tags, and wherein the pipelined snoop bus is ported to each of said dedicated set of snoop tags.

12. A non-inclusive cache system as claimed in claim 4, wherein said set of tags includes a set of cache tags and a dedicated set of snoop tags duplicating said set of cache tags, and wherein the pipelined snoop bus is ported to each of said dedicated set of snoop tags.

13. A non-inclusive cache system as claimed in claim 5, wherein said set of tags includes a set of cache tags and a dedicated set of snoop tags duplicating said set of cache tags, and wherein the pipelined snoop bus is ported to each of said dedicated set of snoop tags.

14. A non-inclusive cache system as claimed in claim 1, wherein said set of tags includes a set of dual-ported cache tags.

15. A non-inclusive cache system as claimed in claim 2, wherein said set of tags includes a set of dual-ported cache tags.

16. A non-inclusive cache system as claimed in claim 3, wherein said set of tags includes a set of dual-ported cache tags.

17. A non-inclusive cache system as claimed in claim 4, wherein said set of tags includes a set of dual-ported cache tags.

18. A non-inclusive cache system as claimed in claim 5, wherein said set of tags includes a set of dual-ported cache tags.

19. In a multi-processor system having a plurality of processors accessing a common shared main memory, a non-inclusive memory cache system, comprising:

a plurality of first on-chip memory caches, each of said first on-chip memory caches corresponding to a different one of said plurality of processors and each having a set of first on-chip memory cache tags and a set of dedicated snoop tags;

a shared external cache for accessing the shared main memory, said shared external cache having a set of cache tags;

a pipelined snoop bus connected to each set of said dedicated snoop tags for each of said first on-chip memory caches;

a system interface unit connected to said external cache and connected via said pipelined snoop bus to each set of dedicated snoop tags, and in response to receiving a snoop request, scanning said external cache for an address matching a snoop address of the received snoop request, and applying the snoop address for the received snoop request to said pipelined snoop bus for transmission to each set of said dedicated snoop tags.

20. In a multi-processor system having a plurality of processors accessing a common shared main memory, a non-inclusive memory cache system, comprising:

a plurality of first on-chip memory caches, each of said first on-chip memory caches corresponding to a different one of said plurality of processors and each having a set of first on-chip memory cache tags having dual ports, one of said dual ports being a dedicated snoop tag port;

a shared external cache for accessing the shared main memory, said shared external cache having a set of cache tags;

a pipelined snoop bus connected to each of said dedicated snoop tag ports for each of said first on-chip memory caches;

a system interface unit connected to said external cache and connected via said pipelined snoop bus to each of said dedicated snoop tag ports for each of said first on-chip memory caches, and in response to receiving a snoop request, scanning said external cache for an address matching a snoop address of the received snoop request, and applying the snoop address for the received snoop request to said pipelined snoop bus for transmission to each set of said dedicated snoop tags.

* * * * *